Patented Oct. 4, 1949

2,483,418

UNITED STATES PATENT OFFICE 2,483,418

TOBACCO COMPOSITION

Jonas Kamlet, New York, N. Y., assignor to Publicker Industries Inc., Philadelphia, Pa.

No Drawing. Application November 28, 1945, Serial No. 631,477

1 Claim. (Cl. 131—17)

The present invention relates to certain new and useful compositions of matter and processes for producing the same and it relates more particularly to humectants and moisture-retaining agents, and it relates still more particularly to compositions of matter containing alpha-methylglycerine as the active humectant and/or moisture-retaining ingredient, and to processes for treating substances with alpha-methylglycerine so as to improve their moisture-retaining properties.

An object of the present invention is to provide a superior humectant for use in the processing of tobacco and other products wherein moisture content must be maintained within relatively narrow limits.

Other objects and advantages of the present invention are apparent in the following detailed description and appended claim.

Alpha-methylglycerine is a viscous liquid, ranging in color from colorless to light-yellow. It has a density of 1.23–1.25 and boiling points of 133–135° C. at 5 mm., 163–165° C. at 15 mm., and 170–173° C. at 25 mm. It is very soluble in, and completely miscible in all proportions with, water, methanol, ethanol, isopropanol and glycerine. It is moderately or slightly soluble in acetone and n-butanol, and very slightly soluble or insoluble in ether, benzene, chloroform, carbon tetrachloride, and ethyl methyl ketone.

Alpha-methylglycerine has, heretofore, not been available on a commercial scale. However, in my copending application Serial No. 631,352, filed November 28, 1945, I describe a process whereby alpha-methylglycerine can be inexpensively produced from butadiene and other low-cost readily available raw materials.

I have found that alpha-methylglycerine has excellent humectant and moisture-retaining properties. A pure sample of this compound, when exposed in an atmosphere of 80% relative humidity for two or three days, will absorb one-half to two-thirds its volume of water.

Alpha-metylglycerine is very stable chemically and is substantially neutral in pH. Having a relatively high boiling point and relatively low vapor pressure at normal temperatures, it does not evaporate to any appreciable extent. It is very viscous at normal temperatures and imparts "body" to compositions into which it is incorporated primarily for its moisture-retaining properties.

Alpha-methylglycerine resembles glycerine in many of its properties. However, the presence of an additional lipophilic methyl group, in conjunction with the three hydrophilic hydroxyl groups, renders alpha-methylglycerine appreciably more soluble in fat solvents than is glycerine. The addition of alpha-methylglycerine increases the mutual solubility of otherwise insoluble or immiscible components of emulsions, pastes, waxes, etc., and also improves the stability of such components during storage, as well as inhibiting the tendency of emulsions to separate into their component phases.

In the formulation of mixes for the manufacturing of tobacco products, such as cigars, cigarettes, pipe mixtures, etc., it is customary practice to incorporate (along with other agents and flavoring ingredients) a bland, hygroscopic liquid substance as a conditioning agent to retain moisture, to avoid brittleness, to render the shredded tobacco pliable and easily handled, and to act as a solvent and penetrating agent for the other additives in the formulation. Ideally, this hygroscopic liquid substance should be combustible, non-toxic and contribute nothing deleterious to the smoke resulting from combustion of the tobacco.

Conventional apparatus for incorporating a conditioning or casing solution into tobacco is disclosed, for example, in Morrison Patent 78,117 dated May 5, 1868.

It has been customary, in the past, to employ glycerine as this hygroscopic liquid substance in the formulation of tobacco mixes; millions of pounds of glycerine having been used annually for this purpose. However, the combustion of glycerine productes acrolein, which is an exceedingly irritating and toxic aldehyde (Redtenbacher, Annalen 47, 114, 1842; Lewin, Archiv fur Experimentelle Pathologie und Pharmakologie, 43, 351, 1900). Because of the undesirable combustion products of glycerine, other humectants have been proposed, in the past, for tobacco, including diethylene glycol (Cone et al., Chem. & Met. Eng. 43, 128–131, 1936). While diethylene glycol does not produce acrolein on combustion and is claimed by some workers in the field to be less irritating to the upper respiratory tract of the smoker, it has been suggested by Goepp (U. S. Patent 2,371,389) that diethylene glycol may be sufficiently volatile to appear as such in the smoke and hence may be absorbed by the system. In view of its known toxicity, diethylene glycol, therefore, may be undesirable in tobacco products and, accordingly, Goepp suggests the use of hexides (that is, the dehydration products of hexitols) as moisture-retaining and conditioning agents for tobacco.

I have now found that alpha-methylglycerine is a superior humectant and moisture-retaining agent for tobacco products. Not only does alpha-methylglycerine compare favorably with glycerine in moisture-absorptive and moisture-retaining properties, but, additionally, it produces, upon combustion, products which are entirely non-toxic and non-irritating.

Thus, alpha-methylglycerine, upon combustion, gives rise to methylglyoxal and finally acetic acid, according to the following reactions:

$$CH_3.CHOH.CHOH.CH_2OH + 2O_2 \rightarrow CH_3CO.CHO + 3H_2O + CO_2$$

$$CH_3COCHO + O_2 \rightarrow CH_3COOH + CO_2$$

Methyl glyoxal is an intermediate of normal carbohydrate metabolism (Neuberg and Kobel, Berichte 63, 1986, 1930; Naturwissentchaften, 18, 427, 1930; Biochemisches Zeit., 203, 463, 1928) while acetic acid is, of course, a common ingredient of many edible and assimilable food substances. Thus, the presence of alpha-methylglycerine in tobacco products creates no irritating or deleterious combustion products.

In the treatment of tobacco products, the moisture-retaining and conditioning agent is usually mixed with sugars and flavoring ingredients in a so-called "casing solution." This solution is then applied to the tobacco by spraying or by dipping. The tobacco so treated is protected against undue dusting, excessive brittleness and undesirable fermentative changes and is found to feed satisfactorily to the cigarette-making machine.

Upon prolonged storage, the presence of alpha-methylglycerine in the finished tobacco product inhibits undesirable changes in the moisture content of the tobacco, aids in retention of quality, flavor and aroma, prevents deterioration, improves its keeping characteristics and inhibits evaporative loss of volatile aromatic components.

The following is an illustrative, but not restrictive, example of the present invention:

EXAMPLE

In order to test the comparative humectant properties of alpha-methylglycerine and glycerine, the following procedure was used:

Accurately-weighed 100.00 gram samples of shredded tobacco were sprayed and mixed by tumbling with 100.0 cc. of a solution containing 4.00 grams of the humectant (either alpha-methylglycerine or glycerine) and 0.10 gram of a wetting agent such as Aerosol OT. The tumbling of the sprayed tobacco may be effected in any conventional tumbling drum or cylinder, as for example that disclosed in Morrison Patent 78,117 dated May 5, 1868.

Approximately 6.0 gram samples of the moist tobacco were placed in tared watchglasses and dried to constant weight in an electric oven at 100° C., according to the procedure of Woodmansee et al. (Journ. Assoc. Offic. Agr. Chem. XXV, 143-145, Feb. 1942). This required about four to six hours.

The dried samples were then transferred to desiccators, each containing 500 cc. of an aqueous sulfuric acid solution designed to yield an atmosphere of constant humidity within the receptacle as described by Willson (Ind. Eng. Chem. 13, 326, 1921). Thus, for 30% relative humidity, a 53.3% sulfuric acid solution was employed. Similarly, 40% relative humidity was attained with a 48.2% sulfuric acid solution, 50% humidity with a 43.2% solution, 60% humidity with a 38.4% solution, 70% humidity with a 33.5% solution and 80% humidity with a 27.2% solution.

Three dried samples each of tobacco treated with alpha-methylglycerine and glycerine respectively were placed in each desiccator; the vessel being sealed and allowed to come to equilibrium by standing at room temperature (25° C.) for 48 hours. The samples were then removed and weighed as rapidly as possible with the results set forth in the table.

Table

| Relative Humidity | Average Increase in Weight Using alpha-Methyl-glycerine | Average Increase in Weight Using Glycerine |
|---|---|---|
| Percent | Percent | Percent |
| 30 | 3.05 | 3.02 |
| 40 | 4.58 | 5.01 |
| 50 | 6.06 | 6.36 |
| 60 | 10.09 | 10.43 |
| 70 | 17.23 | 18.00 |
| 80 | 24.61 | 24.81 |

It can be seen that, as a humectant and conditioning agent for tobacco products, alpha-methylglycerine is comparable to glycerine. As described above, alpha-methylglycerine possesses the added advantage of not producing acrolein upon combustion as does glycerine.

The present invention may be embodied in other specific forms without departing from the spirit or essential attributes thereof, and it is therefore desired that the present embodiments be considered in all respects as illustrative and not restrictive, reference being had to the appended claim rather than to the foregoing description to indicate the scope of the invention.

Having thus described my invention, I claim as new and desire to protect by Letters Patent:

A composition of matter comprising tobacco having appreciable moisture content and containing a small amount of alpha-methylglycerine intimately and more or less uniformly dispersed therethrough, said alpha-methylglycerine serving as a humectant, conditioning agent, moisture-retaining and moisture-absorbing agent, and producing no toxic combustion products.

JONAS KAMLET.

REFERENCES CITED

The following references are of record in the file of this patent:

UNITED STATES PATENTS

| Number | Name | Date |
|---|---|---|
| 78,117 | Morrison | May 19, 1868 |
| 1,924,990 | Harris et al. | Aug. 29, 1933 |

FOREIGN PATENTS

| Number | Country | Date |
|---|---|---|
| 471,888 | Great Britain | Sept. 9, 1937 |

OTHER REFERENCES

Delaby, Annales de Chimie, Series 9, Tome 19, pages 318, 319 (1923). (Copy in Scientific Library.)

Goodman, Cosmetic Dermatology (1936), page 51. (Copy in Div. 43.)